J. F. BROWN.
PICTURE EXHIBITOR.
APPLICATION FILED DEC. 19, 1912.
1,097,609.
Patented May 26, 1914.
2 SHEETS—SHEET 1.
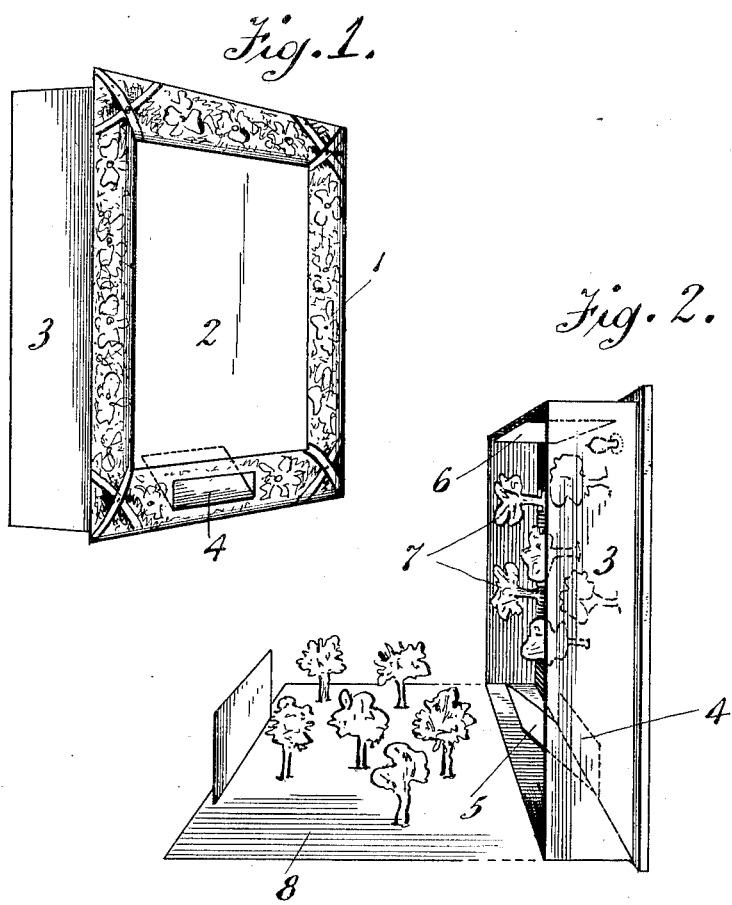

J. F. BROWN.
PICTURE EXHIBITOR.
APPLICATION FILED DEC. 19, 1912.
1,097,609.
Patented May 26, 1914.
2 SHEETS—SHEET 2.
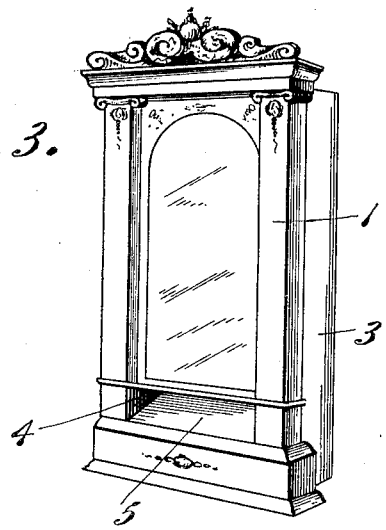
Fig. 3.
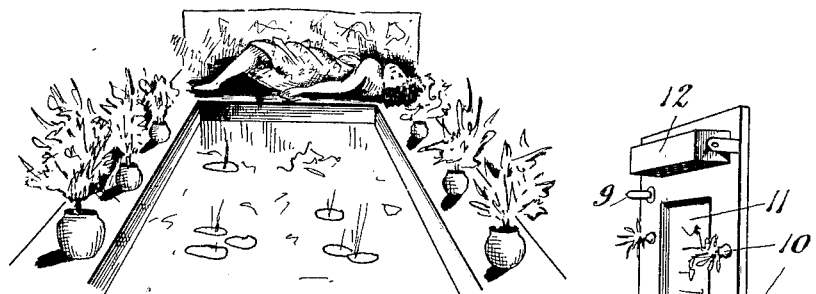
Fig. 5.
Fig. 4.
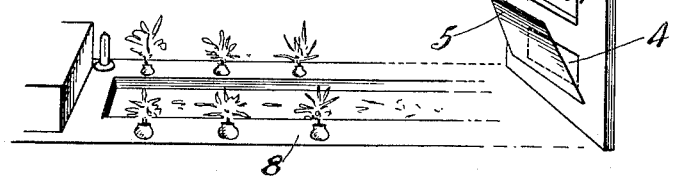
Witnesses:
Inventor
James F. Brown
By his Attorneys

UNITED STATES PATENT OFFICE.

JAMES F. BROWN, OF NEW YORK, N. Y.

PICTURE-EXHIBITOR.

1,097,609.     Specification of Letters Patent.     Patented May 26, 1914.

Application filed December 19, 1912. Serial No. 737,675.

*To all whom it may concern:*

Be it known that I, JAMES F. BROWN, a citizen of the United States, and a resident of the borough of Manhattan, city, county, and State of New York, have made certain new and useful Improvements in Picture-Exhibitors, of which the following is a full and clear specification.

My invention relates to a novel and simple means of exhibiting a hidden picture or other work of art.

In carrying out my invention I utilize a frame such for example as the ordinary picture frame having within it a plane surface, on which may be a picture, or which may be a mirror or the like, the frame in rear of such plane surface being boxed in to provide a light tight chamber. The frame may be of the usual shape and dimensions of an ordinary picture or mirror frame and adapted to be placed vertically or approximately vertically upon the wall or on any support. Within this closed in chamber are arranged the work of art to be exhibited and means for viewing the same which will be described with reference to the accompanying drawings, and the novel features of which will then be pointed out in the claims.

Figure 1 is an external perspective view of a picture exhibitor constructed in accordance with my invention. Fig. 2 is a perspective view of the same taken at a different angle and with the rear removed, and showing in horizontal projection the optical effect produced by the invention. Fig. 3 is an external perspective view of a different form of the invention. Fig. 4 is a perspective view of the same taken from the side with the inclosing casing or frame omitted, and exhibiting in horizontal projection the optical effect in this instance. Fig. 5 is a perspective view taken from the front of the picture exhibited by this device.

Referring now to Figs. 1 and 2, 1 may represent a frame such as an ordinary flat picture frame having within it the plane surface 2, which may be a mirror or a plane surface of any kind, which may, if desired, bear a picture such as illustrated in Fig. 6.

In rear of the frame 1 is a light tight box or casing 3 and in the frame at 4 is provided an aperture which may or may not be covered by transparent glass. In rear of the aperture 4 is arranged an inclined mirror 5 and above the same within the casing is arranged the picture or artistic object to be exhibited which may, as in the instance shown in Fig. 2, in which the rear face of the box or casing is removed to show the interior, consist of a picture 6 and a series of actual objects such as trees 7 supported upon the rear of the front plate or frame of the structure. With this device when the observer looks through the opening 4, in the direction shown by the arrow, he sees the objects 6 and 7 upon the mirror 5, the actual optical effect being as if they were spread out horizontally as shown at 8 in said figure. Any means of lighting the interior may be provided, for example the lamp 9. In the form of the invention shown in Figs. 3, 4 and 5, a similar arrangement is made. Here I have shown an electric lamp 9 controlled from any suitable source, a series of actual objects such as flower pots 10 and a mirror 11 to represent a tank surrounded by flowers and a revolving rectangular frame 12 on the several faces of which may be painted pictures, any one of which may be exposed by rotating the same in any preferred manner from the outside, the result being that the picture is projected as shown at 8 in Fig. 4 giving the effect exhibited in Fig. 5. Here the view aperture 4 is arranged as shown in Fig. 3 extending from side to side of the frame 1.

What I claim is:

1. A device of the character described, comprising a light tight frame, a view aperture therein, a reflector within the frame opposite said aperture, and a picture to be viewed disposed on the reverse face of said frame above said aperture.

2. A device of the character described, comprising a light tight frame, a view aperture therein, a reflector within the frame opposite said aperture, and a series of objects to be viewed placed vertically above the aperture on the inside of the frame and at various distances from the aperture.

3. A device of the character described, comprising a light tight frame, a view aperture therein, a reflector within the frame opposite said aperture, and a series of objects to be viewed placed vertically above the aperture on the inside of the frame and at various distances from the aperture, the said objects including a rotatable part.

JAMES F. BROWN.

Witnesses:
WM. A. COURTLAND,
HARRY E. KNIGHT.

---

Copies of this patent may be obtained for five cents each, by addressing the " Commissioner of Patents, Washington, D. C."